United States Patent Office 3,383,823
Patented May 21, 1968

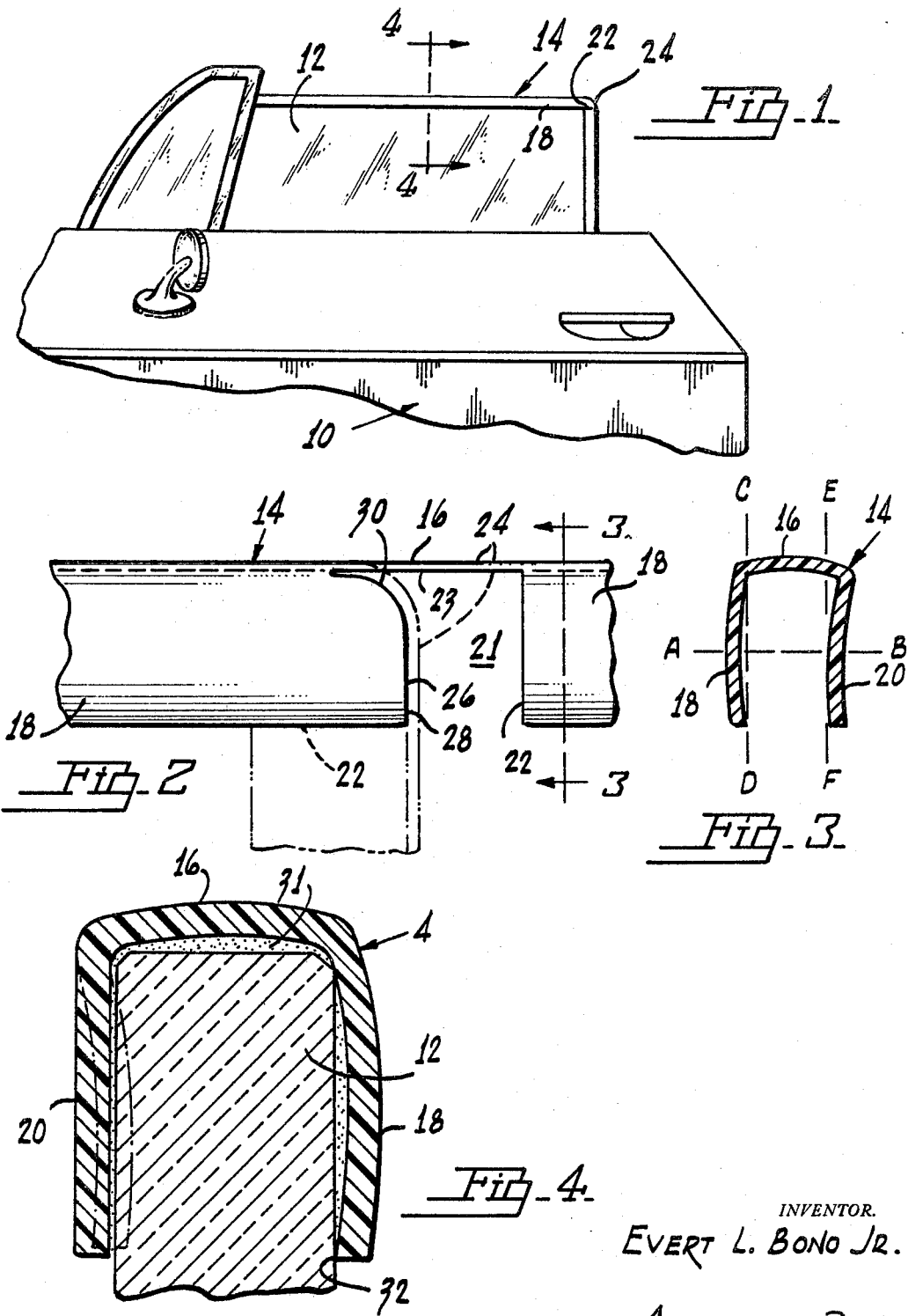

3,383,823
AUTOMOBILE WINDOW GLASS TRIM
Evert L. Bono, Jr., Boonton, N.J., assignor to Boonton Molding Company, Boonton, N.J., a corporation of New Jersey
Filed Aug. 2, 1966, Ser. No. 569,686
3 Claims. (Cl. 52—716)

ABSTRACT OF THE DISCLOSURE

A trim strip for automobile windows, especially designed for application by the car owner and formed from plastic material having the appearance of chrome-plated metal. The strip is of U-shaped cross-section, and has resiliently deformable, transversely curved side walls one of which is bowed inwardly and the other outwardly. The strip is resiliently spreadable, pivoting on the edge of the outwardly curved wall until it straddles the edge of the glass. In the final position of the strip, the inwardly bowed wall is flattened out against the glass.

---

This invention relates generally to protective and ornamental edgings for glass panes, and more particularly has reference to a trim or molding strip designed particularly for application to the edge of an automobile window, whereby to serve as a guard or protector therefor, while also and perhaps more importantly, enhancing the appearance of the automobile.

Many of the more expensive makes of automobiles are provided with chrome trim strips, for the edges of the side windows of the vehicle. These add measurably to the attractive appearance of the vehicles, and in addition, serve certain utilitarian functions. For example, a trim strip of the type described provides a visual indication of the edge of the window. Without the strip, it is often difficult to note the location of the window edge, and many individuals, especially children, are injured by striking their heads or faces against the window.

In addition, a trim strip as described improves the fit of the window in the door channels, and helps to eliminate wind noise by effecting a tightening of the window in the guide means provided therefor within the vehicle door.

The main object of the present invention is to provide a trim strip having the characteristics described above, that can be applied by a vehicle owner as an accessory, if the vehicle does not already have a trim strip as original equipment.

A more particular object is to provide a trim strip as stated that will be capable of manufacture at very low cost, by reason of the novel formation of the strip from a plastic material rather than the usual chrome-plated metal, said plastic material being nevertheless formed in the simulation of a highly polished metal and being thus virtually indistinguishable from actual metal.

Another object is to provide a trim strip or molding of the character described which will be so designed as to permit the same to be readily applied to a window in a way such as to permit the user to bend the strip around a rounded corner of the window.

Another object is to provide a trim strip of the character stated that will be designed to fit windows of different thicknesses.

Another object is to provide a trim strip that will be applicable to a window without the use of tools, and without any requirement on the part of the installer for cutting specially shaped recesses in the side walls of the strip.

Still another object is to provide a trim or molding strip that can be quickly cut to a selected length merely by the use of scissors, razorblade or sharp knife.

A further object of importance is to provide a cross-sectional shape in the channeled strip, such as to not only facilitate the application of the strip to windows of different thicknesses, but also, to effect a particularly tight gripping or hugging action of the channel member in respect to the edge portion of the window. This is of importance during the setting or curing of the adhesive used to effect a permanent bond of the strip to the window.

Still another object is to provide a trim strip as stated that will be designed for universal application, that is, will be adapted to fit the windows of almost all automobiles of modern design.

Summarized briefly, the invention comprises a trim or molding strip formed of a single piece of plastic material at least the exterior surface of which is fashioned in the simulation of a highly polished metal, such as a chrome-plated steel. The molding strip, so formed, has side walls that are formed with deeply cut recesses, aligned transversely of the channel member. These recesses cause the web of the strip to be flexible over the length of said recesses, as distinguished from the remainder of the strip, which is rigidly maintained against longitudinal flexure.

In accordance with the invention, the side walls of the channel member are transversely curved. One side wall is bowed outwardly, while the other is bowed inwardly, in such a fashion as to permit the inwardly bowed side wall to be resiliently flexed away from the opposite wall so as to snugly receive a flat or substantially flat automobile window. The outwardly bowed wall is so designed as to provide a pressure point against the glass along the outer longitudinal edge of said outwardly bowed wall, so as to effect the transverse flexure of the inwardly bowed wall to a substantially flat condition in the applied position of the device.

Other objects will appear from the following description, the claims appended thereto, and from the annexed drawings, in which like reference characters designate like parts throughout the several views, and wherein:

FIG. 1 is a fragmentary side elevational view of an automobile door, showing the trim strip of the invention applied to the door window;

FIG. 2 is an enlarged, fragmentary side elevational view of the strip, the strip being shown in full lines in its initial, straight condition, and in chain-dotted lines in the position assumed thereby when it is bent around a corner of the window;

FIG. 3 is a transverse sectional view on the same scale as FIG. 2, taken substantially on line 3—3 of FIG. 2; and FIG. 4 is a still further enlarged transverse sectional view substantially on line 4—4 of FIG. 1, the device being shown in full lines in its final position on the window edge, and in dotted lines in the position before application to said window edge.

Referring to the drawing in detail, the reference numeral 10 generally designates an automobile door, while at 12 I have designated the usual door window.

The invention has been generally designated 14, and comprises a single strip of plastic material the length of which can vary according to the desires of the particular manufacturer. It is possible that the strips can be made in a few standard lengths, each of which is designed to fit the windows of a number of automobiles. In any event, the material of which the strip is formed is such as to permit it to be cut with a razor or shears, by the user, without difficulty.

The trim strip, in accordance with the invention, is formed of a single piece of plastic material, having the shape of a channel member so as to receive the edge of the window 12. Thus, the strip includes a web 16 connecting side walls 18 and 20.

The channel formation of the strip imparts rigidity thereto in the longitudinal direction, where the side walls are unbroken. Thus, the strip is rigidly constituted against longitudinal flexure for the greatest part of its length. However, at any location at which the strip is to be made bendable, I cut away the side walls, at transversely aligned locations, as shown to particular advantage in FIG. 2. Thus, I provide, in each side wall at the desired location, a recess 21, which is cut deeply into the side wall, across the full width thereof. Recess 21 has a straight wall or edge 22, disposed normally to the longitudinal center line of the side wall in which the recess is formed. The recess also has, in the unbent condition of the strip, a straight inner edge 23, which constitutes the longitudinal edge of web 16.

The cutting of the recess 21 fully to the edge of the web 16 defines a flexible portion or hinge 24, formed out of the web material, and extending over the full length of the recess 21. In this way, the trim strip, though maintained rigidly against longitudinal flexure for the greatest part of its length, is of longitudinally flexible formation at the selected location denoted by the transversely aligned recesses 21 of side walls 18, 20.

The opposite edge of the recess has been designated 26, and includes an outer edge portion 28 which is parallel to the edge 22. This portion is, thus, straight, and extends from the outer longitudinal edge of the side wall to a location approximately coincident with the longitudinal center line of the side wall 18 or 20 as the case may be. From this point to the edge 23, the edge 26 is curved through 90 degrees as at 30, into convergence with the straight edge 23.

By reason of this arrangement, the strip, when applied to the edge of the window, can be bend around a curved corner of the window as shown in dotted lines in FIG. 2. The flexible hinge 24 extends around the corner of the window, and is of a length such that the edge 22 moves into longitudinally contacting relation to the outer longitudinal edge of the side wall 18 or 20 as the case may be. The result is that the strip assumes the shape shown in FIG. 1, in which it extends in contact with the window edge, around the corner of the edge, thus covering both the top and the side edges of the window as shown in FIG. 1.

A neat joint is thus provided, at the corner of the window, having the desirable characteristics of strength and full coverage of the corner area of the window.

Referring now to FIGS. 3 and 4, the channel member, when viewed in cross-section, has a particular shape which has been found to be especially advantageous in adapting the device to a large variety of automobile windows, while assuring that the device will tightly grip the window during the setting of the adhesive used therewith. Thus, and referring to FIG. 3, initially the device in cross-section is so formed that side wall 20 is bowed inwardly toward side wall 18 when seen in cross-section. Side wall 18 is transversely curved outwardly. This particular construction can be seen and understood better by referring first to the line E–F. This line has been drawn as a straight line, coplanar with the inner surface of the side wall 20, from a location denoted by the transverse line A–B. Line A–B falls upon the longitudinal center line of the side wall 18 or, in any event, close to said longitudinal center line.

From the outer longitudinal edge to the line A–B, that is, through substantially the outer half of the width of the side wall 20, said side wall is straight. However, beginning at the line A–B and continuing over the inner half of the side wall 20, said side wall is bowed outwardly from the line E–F. The general effect, is to transversely inwardly bend the side wall 20.

Web 16 may also be transversely curved, being bowed outwardly so as to conform to a transverse curvature of the window, which is typical of many automobile windows.

Side wall 18, over its full length, is symmetrically curved outwardly when viewed in cross-section, in respect to the longitudinal center line, that is, a line in plane A–B. The sidewall 18 is thus transversely curved outwardly from a line C–D, said line being parallel to the line E–F and perpendicular to the line A–B.

The manner in which the particular formation operates during the application of the product to a window is shown in FIG. 4. Adhesive 31 is coated upon the window edge, along the sides of the window and the edge portion proper. Initially, the inward bowing of line 20 causes the space between the outer longitudinal edges of the side walls 18, 20 to be slightly less than the thickness of the window 12. However, side wall 20 is slightly resilient in a transverse direction, and accordingly, when the channel member is fitted onto the window, the side walls will be relatively spread apart. This causes the side wall 20 to assume a substantially straight cross-sectional shape, while side wall 18 retains its transverse curvature. Side wall 18 by reason of said curvature, has a pressure point denoted by the reference numeral 32, extending along its outer longitudinal edge. This pressure point comprises a point about which the entire strip pivots as seen in cross-section, to spread the walls and straighten out wall 20 to whatever extent is necessary to cause it to fit the window. Actually, the device is so designed that it will accommodate itself to windows of different thicknesses, so long as the thickness is not substantially less than the distance between the outer longitudinal edges of the side walls when said side walls are in their initial condition before application to the window.

The transverse curvature of walls 18, 16, further, defines pockets for the adhesive, to strengthen the bond during the curing of the adhesive material.

When the device is finally applied, it has a simulation of a chrome-plate metal. Yet, it is capable of manufacture at low cost, is easily applied, and is corrosion and rust proof.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any changes in construction that may be permitted within the scope of the appended claims.

I claim:

1. Automobile window glass trim comprising a single strip of plastic material at least the exterior surface of which is in the simulation of a highly polished metal, said strip being in the form of a channel member to receive the edge of an automobile window glass and being bendable in a longitudinal direction to follow the contour of said edge, the channeled form of said strip defining resiliently deformable side walls and a connecting web thereon, one of said side walls being transversely curved inwardly through approximately half its width from the web to the general area of the longitudinal center line of said one side wall and being generally flat through the remainder of its width.

2. Automobile window glass trim as in claim 1 wherein the other side wall is continuously transversely curved over its full width outwardly from said one side wall.

3. Automobile window glass trim as in claim 2 wherein the flat portion of the width of said one side wall lies in a plane normal to a plane that is approximately coincident with the longitudinal center lines of the respective side walls in parallel relation to the general plane of the web.

References Cited

UNITED STATES PATENTS

| | | | |
|---|---|---|---|
| 283,136 | 8/1883 | Mosler | 95—115 |
| 2,080,593 | 5/1937 | Albert | 52—627 |
| 2,743,980 | 5/1956 | Hobbs | 52—627 |
| 2,831,244 | 4/1958 | Adell | 49—462 |
| 2,928,201 | 3/1960 | Shanok et al. | 161—100 |
| 3,198,689 | 8/1965 | Lansing | 161—100 |
| 3,239,891 | 3/1966 | Gardner | 52—627 |
| 3,282,014 | 11/1966 | Bamford et al. | 52—627 |

FRANCIS K. ZUGEL, *Primary Examiner.*